(12) United States Patent
Tang

(10) Patent No.: US 11,317,418 B2
(45) Date of Patent: Apr. 26, 2022

(54) COMMUNICATION METHOD AND COMMUNICATION APPARATUS

(71) Applicant: Guangdong OPPO Mobile Telecommunications Corp., Ltd., Guangdong (CN)

(72) Inventor: Hai Tang, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 199 days.

(21) Appl. No.: 16/311,112

(22) PCT Filed: Sep. 22, 2016

(86) PCT No.: PCT/CN2016/099761
§ 371 (c)(1),
(2) Date: Dec. 18, 2018

(87) PCT Pub. No.: WO2018/053765
PCT Pub. Date: Mar. 29, 2018

(65) Prior Publication Data
US 2020/0314853 A1    Oct. 1, 2020

(51) Int. Cl.
*H04W 72/04* (2009.01)
*H04L 5/00* (2006.01)

(52) U.S. Cl.
CPC ....... *H04W 72/0493* (2013.01); *H04L 5/0051* (2013.01); *H04W 72/042* (2013.01); *H04W 72/046* (2013.01); *H04W 72/0413* (2013.01)

(58) Field of Classification Search
CPC ......... H04W 72/0493; H04W 72/0413; H04W 72/042; H04W 72/046; H04L 5/0051
See application file for complete search history.

(56) References Cited

U.S. PATENT DOCUMENTS 9,060,360 B2 * 6/2015 Yang ..................... H04L 1/0031
9,276,709 B2    3/2016 Mazzarese et al.
(Continued)

FOREIGN PATENT DOCUMENTS

CN    103155506 A    6/2013
CN    103733559 A    4/2014
(Continued)

OTHER PUBLICATIONS

China Second Office Action with English Translation for CN Application 201680087146.1 dated Sep. 18, 2020.
(Continued)

*Primary Examiner* — Michael J Moore, Jr.
(74) *Attorney, Agent, or Firm* — Young Basile Hanlon & MacFarlane, P.C.

(57) ABSTRACT

A communication method and a communication device are provided. The communication method includes: a terminal device transmits a preset uplink sequence, the preset uplink sequence is used for triggering a network device which receives the preset uplink sequence to transmit a first downlink reference signal; and the terminal device receives the first downlink reference signal transmitted by at least one first network device according to the preset uplink sequence, the network device includes the at least one first network device.

18 Claims, 2 Drawing Sheets

(56) References Cited

U.S. PATENT DOCUMENTS

| | | | |
|---|---|---|---|
| 2012/0163305 A1* | 6/2012 | Nimbalker | H04W 52/0206 370/329 |
| 2013/0250847 A1 | 9/2013 | Lee et al. | |
| 2014/0086173 A1* | 3/2014 | Sadeghi | H04L 5/003 370/328 |
| 2014/0314000 A1* | 10/2014 | Liu | H04W 72/042 370/329 |
| 2014/0321314 A1* | 10/2014 | Fodor | H04W 24/10 370/252 |
| 2016/0165466 A1 | 6/2016 | Kim et al. | |
| 2016/0255548 A1* | 9/2016 | Cedergren | H04W 36/0094 370/332 |
| 2017/0302419 A1* | 10/2017 | Liu | H04L 27/262 |
| 2017/0366377 A1* | 12/2017 | Papasakellariou | H04L 5/005 |
| 2018/0014301 A1* | 1/2018 | Chen | H04L 5/0057 |
| 2018/0034611 A1* | 2/2018 | Nagaraja | H04W 24/08 |
| 2018/0115401 A1* | 4/2018 | Cedergren | H04W 4/027 |
| 2018/0205526 A1* | 7/2018 | Kim | H04L 5/0055 |
| 2018/0248736 A1* | 8/2018 | Davydov | H04W 76/27 |
| 2018/0255586 A1* | 9/2018 | Einhaus | H04W 52/0219 |
| 2018/0343043 A1* | 11/2018 | Hakola | H04W 36/00837 |
| 2019/0123864 A1* | 4/2019 | Zhang | H04L 5/0023 |
| 2019/0159097 A1* | 5/2019 | Tang | H04W 36/08 |
| 2019/0215120 A1* | 7/2019 | Tang | H04L 27/26 |
| 2020/0067583 A1* | 2/2020 | Shin | H04B 7/0643 |
| 2020/0314733 A1* | 10/2020 | Tang | H04W 36/0061 |
| 2020/0314853 A1* | 10/2020 | Tang | H04W 72/0413 |
| 2020/0336193 A1* | 10/2020 | Park | H04B 7/0695 |

FOREIGN PATENT DOCUMENTS

| | | |
|---|---|---|
| CN | 104205978 A | 12/2014 |
| CN | 104838603 A | 8/2015 |
| CN | 105338566 A | 2/2016 |
| CN | 105472541 A | 4/2016 |
| CN | 105519206 A | 4/2016 |
| CN | 105577255 A | 5/2016 |
| CN | 105790905 A | 7/2016 |
| JP | 2015516736 A | 6/2015 |
| WO | 2013025503 A1 | 2/2013 |
| WO | 2014088185 A1 | 6/2014 |
| WO | 2014113971 A1 | 7/2014 |
| WO | 2015114524 A1 | 8/2015 |
| WO | 2016045695 A1 | 3/2016 |

OTHER PUBLICATIONS

Communication pursuant to Article 94(3) EPC Examination for EP Application 16916504.0 dated Sep. 8, 2020.
Japan Office Action with English Translation for JP Application 2018-567144 dated Oct. 19, 2020.
Extended European Search Report issued in corresponding European Patent Application No. 16916504.0 dated Jun. 5, 2019.
3GPP TSG RAN WG1 #86; R1-166658; Gothenburg,Sweden, Aug. 22-26, 2016.
English translation of India OA for Application 201817049654 dated Jul. 23, 2020.
English translation of CN Office Action for CN Application 201680087146.1 dated May 28, 2020.
Taiwan First Office Action with English Translation for TW Application 11020233030 dated Mar. 15, 2021.
Summons to attend oral proceedings pursuant to Rule 115(1) EPC for EP Application 16916504.0 dated Dec. 3, 2021. (8 pages).
Taiwan Office Action with English Translation for TW Application 106129442 dated Nov. 17, 2021. (3 pages).

* cited by examiner

100

S110: A terminal device transmits a preset uplink sequence, the preset uplink sequence is used for triggering a network device which receives the preset uplink sequence to transmit a first downlink reference signal.

S120: The terminal device receives the first downlink reference signal transmitted by at least one first network device according to the preset uplink sequence.

S210: A first network device receives a preset uplink sequence transmitted by a terminal device, the preset uplink sequence is used for triggering a network device which receives the preset uplink sequence to transmit a first downlink reference signal.

S220: The first network device transmits the first downlink reference signal to the terminal device according to the preset uplink sequence.

FIG. 2

Communication apparatus 300

Transmitting module 310

Receiving module 320

FIG. 3

COMMUNICATION METHOD AND COMMUNICATION APPARATUS

CROSS-REFERENCE TO RELATED APPLICATION(S)

This application is a 371 application of International Application No. PCT/CN2016/099761, filed on Sep. 22, 2016, the entire disclosure of which is hereby incorporated by reference.

TECHNICAL FIELD

The present disclosure relates to the field of communication, in particular to a communication method and a communication apparatus.

BACKGROUND

In a communication system, Reference Signals (RS) are a set of known signals transmitted by a transmitting end for a receiving end to perform operations such as channel estimation. The existing Long Term Evolution (LTE) system includes various downlink reference signals, such as Cell-specific Reference Signals (CRS) and Channel State Information-Reference Signals (CSI-RS). The existing downlink reference signals are transmitted over the entire system bandwidth according to certain rules (e.g., a certain period), such that the terminal device estimates the channel condition according to the downlink reference signals. This transmission mode of the downlink reference signals will lead to meaningless transmission of a large number of downlink reference signals, resulting in resource waste. Therefore, it is needed to design a new transmission mode for downlink reference signals to decrease the meaningless transmission of the downlink reference signals.

SUMMARY

The present disclosure provides a communication method and a communication apparatus, which can decrease meaningless transmission of downlink reference signals and improve the resource utilization.

In a first aspect, the present disclosure provides a communication method. The communication method includes: transmitting, by a terminal device, a preset uplink sequence, wherein the preset uplink sequence is used for triggering a network device which receives the preset uplink sequence to transmit a first downlink reference signal; and receiving, by the terminal device, the first downlink reference signal transmitted by at least one first network device according to the preset uplink sequence.

In a second aspect, a communication method is provided. The communication method includes: receiving, by a first network device, a preset uplink sequence transmitted by a terminal device, wherein the preset uplink sequence is used for triggering a network device which receives the preset uplink sequence to transmit a first downlink reference signal; and transmitting, by the first network device, the first downlink reference signal to the terminal device according to the preset uplink sequence.

In a third aspect, the present disclosure provides a communication apparatus. The communication apparatus is a terminal device and is used for executing the communication method in the first aspect or any optional implementation mode of the first aspect. Specifically, the communication apparatus includes modules and/or units used for executing the communication method in the first aspect or any possible implementation mode of the first aspect.

In a fourth aspect, a communication apparatus is provided. The communication apparatus is a first network device and is used for executing the communication method in the second aspect or any optional implementation mode of the second aspect. Specifically, the communication apparatus includes modules and/or units used for executing the communication method in the second aspect or any possible implementation mode of the second aspect.

In a fifth aspect, a communication device is provided. The communication device is a terminal device and includes: a transceiver, a memory and a processor, the transceiver is used for receiving and transmitting signals/information, the memory is used for storing instructions, the processor is used for executing the instructions stored in the memory, and when the processor executes the instructions stored in the memory, the execution enables the processor to execute the communication method in the first aspect or any optional implementation mode of the first aspect.

In a sixth aspect, a communication device is provided. The communication device is a first network device and includes: a transceiver, a memory and a processor, the transceiver is used for receiving and transmitting signals/information, the memory is used for storing instructions, the processor is used for executing the instructions stored in the memory, and when the processor executes the instructions stored in the memory, the execution enables the processor to execute the communication method in the second aspect or any optional implementation mode of the second aspect.

In a seventh aspect, a computer storage medium is provided, program codes are stored in the computer storage medium, and the program codes are used for instructing execution of the method in the first aspect or any optional implementation mode of the first aspect.

In an eighth aspect, a computer storage medium is provided, program codes are stored in the computer storage medium, and the program codes are used for instructing execution of the method in the second aspect or any optional implementation mode of the second aspect.

BRIEF DESCRIPTION OF DRAWINGS

In order to describe technical solutions of implementations of the present disclosure more clearly, the drawings to be used in the implementations of the present disclosure will be introduced below in brief. Apparently, the drawings described below are only some of the implementations of the present disclosure, and one skilled in the art may obtain other drawings according to these drawings without paying any inventive effort.

FIG. 1 illustrates a schematic flowchart of a communication method according to an implementation of the present disclosure.

FIG. 2 illustrates a schematic flowchart of a communication method according to another implementation of the present disclosure.

FIG. 3 illustrates a schematic diagram of a communication apparatus according to an implementation of the present disclosure.

DETAILED DESCRIPTION

Figure 4:
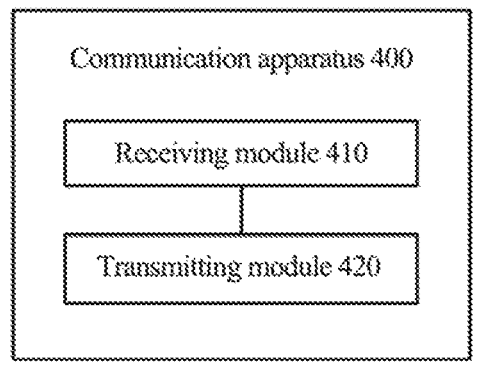
FIG. 4 illustrates a schematic diagram of a communication apparatus according to another implementation of the present disclosure.

Technical solutions in implementations of the present disclosure will be clearly and completely described below in combination with drawings of the implementations of the present disclosure. Apparently, the described implementations are just part, but not all, of implementations of the present disclosure. All other implementations obtained by one skilled in the art based on the implementations in the present disclosure without paying any inventive effort shall be included in the protection scope of the present disclosure.

The technical solutions of the implementations of the present disclosure can be applied to various communication systems of wireless cellular networks, such as Global System of Mobile Communication (GSM) systems, Code Division Multiple Access (CDMA) systems, Wideband Code Division Multiple Access (WCDMA) systems, General Packet Radio Service (GPRS) systems, LTE systems, Universal Mobile Telecommunications System (UMTS), and future 5G communication systems, which are not restricted in the implementations of the present disclosure.

In implementations of the present disclosure, a terminal device is described in various implementations. User Equipment (UE) may be referred to as a terminal, a Mobile Station (MS), a mobile terminal, etc., which may communicate with one or more core networks via a Radio Access Network (RAN). For example, a terminal device may be a mobile phone (or "cellular" phone), a computer with a mobile terminal, etc. For example, terminal devices may also be portable, pocket-size, handheld, computer-built or vehicle-mounted mobile devices, and terminal devices in future 5G networks that exchange speech and/or data with wireless access networks.

In an implementation of the present disclosure, a network device may be a controller for a cell, and the network device may be used to control the corresponding cell to receive and transmit information or signals. For example, a network device in an implementation of the present disclosure may correspond to an antenna of a base station, N antennas of base stations correspond to N network devices one to one, and the N network devices control N cells respectively.

In an implementation of the present disclosure, a base station may be a Long Term Evolution (LTE) system or its evolved system or an Evolutional Node B (eNB or e-Node B) in a future 5G network system, a macro base station, a micro base station (also known as a "small base station"), a pico base station, an Access Point (AP), or a Transmission Point (TP), etc., which is not restricted in the present disclosure.

In a first aspect, the present disclosure provides a communication method. The communication method includes: transmitting, by a terminal device, a preset uplink sequence, wherein the preset uplink sequence is used for triggering a network device which receives the preset uplink sequence to transmit a first downlink reference signal; and receiving, by the terminal device, the first downlink reference signal transmitted by at least one first network device according to the preset uplink sequence.

As compared with the related art in which the terminal device receives downlink reference signals transmitted by multiple network devices according to a certain rule (e.g., a certain period), the terminal device may transmit an uplink sequence according to its own demand, such that the terminal device may receive the first downlink reference signal transmitted by at least one first network device when there is a demand, thus the reception of meaningless reference signals can be decreased, the resource waste can be decreased and the resource utilization can be improved. Further, the terminal device does not need to wait for a transmission period, and the terminal device can transmit the uplink sequence when it has a demand, such that the terminal device can acquire the first downlink reference signal in time and perform relevant operations, and thus the operation efficiency of the terminal device is improved.

Optionally, in a possible implementation mode of the first aspect, transmitting, by the terminal device, the preset uplink sequence may include: transmitting, by the terminal device in a connection state, the preset uplink sequence to a network device in a serving cell of the terminal device; or transmitting, by the terminal device in an idle state, the preset uplink sequence to a network device in a residing cell of the terminal device.

Optionally, in a possible implementation mode of the first aspect, the preset uplink sequence is an uplink sequence known to the network device (or an uplink sequence known to multiple network devices).

In this solution, the preset uplink sequence is an uplink sequence known to multiple network devices, such that any of the multiple network devices can recognize the preset uplink sequence and perform corresponding operations. This solution has good compatibility and extensibility.

Optionally, in a possible implementation mode of the first aspect, the preset uplink sequence includes a preamble of a Packet Random Access Channel (PRACH), and the preamble is used for triggering the network device to transmit the first downlink reference signal, and/or triggering the network device to transmit the first downlink reference signal at a first density.

Optionally, in a possible implementation mode of the first aspect, the terminal device acquires the preamble from a sequence group.

Optionally, in a possible implementation mode of the first aspect, the preset uplink sequence includes uplink Sounding Reference Signal (SRS) or uplink Scheduling Request (SR).

In a possible implementation mode of the first aspect, the communication method further includes: receiving, by the terminal device, a downlink message transmitted by a second network device, wherein the downlink message includes resource information and/or parameter information, the resource information is used for indicating a resource occupied by each of the at least one first network device for transmitting the first downlink reference signal, and the parameter information is used for indicating parameters used by the each first network device for transmitting the first downlink reference signal; and receiving, by the terminal device, the first downlink reference signal transmitted by the at least one first network device according to the preset uplink sequence includes: receiving, by the terminal device, the first downlink reference signal transmitted by the at least one first network device according to the resource information and/or parameter information.

In this solution, the terminal device can receive the downlink message and receive the first downlink reference signal according to the resource information and/or parameter information in the downlink message, thereby improving the efficiency of receiving the first downlink reference signal by the terminal device. Further, the solution has high flexibility, and the terminal device can accurately know in time a resource and/or parameter used by each first network device for transmitting the first downlink reference signal by receiving the downlink message. This method has good compatibility and extensibility.

In a possible implementation mode of the first aspect, the communication method further includes: transmitting, by the terminal device, location information used for indicating the location of the terminal device, for the network device which receives the preset uplink sequence to determine whether to transmit the first downlink reference signal according to the location information.

In a possible implementation mode of the first aspect, the downlink message further includes indication information used for indicating the terminal device, for the terminal device in an idle state to determine that the downlink message belongs to the terminal device according to the indication information.

In this solution, the idle terminal device in an idle state can identify the downlink message which belongs to the terminal device according to the indication information. In other words, the terminal device can determine that the downlink message is responsive to the preset uplink sequence according to the indication information in the downlink message. This solution has high compatibility.

In a possible implementation mode of the first aspect, the indication information includes the preset uplink sequence or an index of the preset uplink sequence.

In a possible implementation mode of the first aspect, the communication method further includes: transmitting, by the terminal device, location information used for indicating a location of the terminal device, wherein the indication information includes the location information; and/or transmitting, by the terminal device, identification information used for identifying the terminal device, wherein the indication information includes the identification information.

In this solution, the terminal device may transmit location information and/or identification information, the downlink message may correspondingly include location information and/or identification information, and after receiving the downlink message, the terminal device may determine that the downlink message is responsive to the preset uplink sequence. Further, when the terminal device transmits the location information, the network device which receives the location information may determine whether to transmit the first downlink reference signal according to the location of the terminal device.

Optionally, in a possible implementation mode of the first aspect, the downlink message includes at least one of the preset uplink sequence, the index of the preset uplink sequence, the location information, and the identification information.

Optionally, in a possible implementation mode of the first aspect, transmitting, by the terminal device, location information used for indicating the location of the terminal device and/or identification information used for identifying the terminal device includes: transmitting, by the terminal device, an uplink message, wherein the uplink message includes the location information and/or the identification information.

In this solution, the terminal device can transmit the location information and/or the identification information through a single message, and thus the signaling overhead can be decreased.

Optionally, in a possible implementation mode of the first aspect, transmitting, by the terminal device, an uplink message includes: transmitting, by the terminal device, the uplink message according to a time domain offset and/or a frequency domain offset, wherein the time domain offset includes an offset between time domain resources occupied by the preset uplink sequence and the uplink message, and the frequency domain offset includes an offset between frequency domain resources occupied by the preset uplink sequence and the uplink message.

In this solution, the terminal device may transmit the uplink message according to the time domain offset and/or frequency domain offset, such that the resource occupied by the preset uplink sequence and the resource occupied by the uplink message have a corresponding relationship, thus the network device which receives the preset uplink sequence can receive the uplink message transmitted by the same terminal device on the corresponding resource after receiving the preset uplink sequence.

In a possible implementation mode of the first aspect, before the terminal device transmits the preset uplink sequence, the communication method further includes: receiving, by the terminal device, the first downlink reference signal transmitted by at least one third network device at a first density, wherein the preset uplink sequence is specifically used for triggering the network device which receives the preset uplink sequence to transmit the first downlink reference signal at a second density. Receiving, by the terminal device, the first downlink reference signal transmitted by the at least one first network device according to the preset uplink sequence includes: receiving, by the terminal device, the first downlink reference signal transmitted by the at least one first network device at the second density according to the preset uplink sequence, wherein the second density is greater than the first density.

In this solution, the terminal device may firstly receive sparse first downlink reference signals. When the terminal device has a demand, the terminal device receives dense first downlink reference signals by transmitting the preset uplink sequence, thus system resources can be saved and the resource utilization can be improved. In this solution, the terminal device does not need to wait for a transmission period, and the terminal device can acquire the dense first downlink reference signals in time by transmitting the uplink sequence when there is a demand.

In a possible implementation mode of the first aspect, when a trigger condition is satisfied, the terminal device transmits the preset uplink sequence used for triggering the network device which receives the preset uplink sequence to transmit a downlink common reference signal, wherein the trigger condition includes at least one of the following conditions: a receiving power for receiving a downlink signal transmitted by a fourth network device is less than a power threshold, the fourth network device is used for controlling a serving cell of the terminal device or a residing cell of the terminal device; and the terminal device is located in a preset area of the fourth network device.

The terminal device can transmit the preset uplink sequence used for triggering the downlink common reference signal under some conditions or situations, and thus system resources occupied by the downlink common reference signal can be decreased.

Optionally, in a possible implementation mode of the first aspect, the trigger condition further includes that mobility management measurement is to be performed.

In a possible implementation mode of the first aspect, the first downlink reference signal includes a downlink reference signal used for the terminal device to perform analog beam forming.

In this solution, the terminal device can acquire the downlink reference signals used for performing analog beam forming by transmitting the uplink sequence when analog beam forming is needed. This solution has high flexibility.

In a possible implementation mode of the first aspect, the preset uplink sequence is specifically used for triggering, through a resource for transmitting the preset uplink sequence and/or a format of the preset uplink sequence, the network device which receives the preset uplink sequence to transmit the first downlink reference signal, and/or triggering the network device which receives the preset uplink sequence to transmit the first downlink reference signal at the second density.

In this solution, the terminal device can indicate the content triggered by the preset uplink sequence through the resource occupied by the uplink sequence and/or the specific format of the uplink sequence. This method has high flexibility, and has good compatibility and extensibility.

In a second aspect, a communication method is provided. The communication method includes: receiving, by a first network device, a preset uplink sequence transmitted by a terminal device, wherein the preset uplink sequence is used for triggering a network device which receives the preset uplink sequence to transmit a first downlink reference signal; and transmitting, by the first network device, the first downlink reference signal to the terminal device according to the preset uplink sequence.

In this solution, the first network device may transmit the first downlink reference signal according to a demand of the terminal device, thus meaningless transmission of the first downlink reference signal can be decreased, resource waste can be decreased and resource utilization can be improved. Further, the first network device may transmit the first downlink reference signal to the terminal device in time when the terminal device has a demand.

Optionally, in a possible implementation mode of the second aspect, the preset uplink sequence includes a preamble of a Packet Random Access Channel (PRACH), and the preamble is used for triggering the network device to transmit the first downlink reference signal, and/or triggering the network device to transmit the first downlink reference signal at a first density.

Optionally, in a possible implementation mode of the second aspect, the preset uplink sequence includes uplink Sounding Reference Signal (SRS) or uplink Scheduling Request (SR).

Optionally, in a possible implementation mode of the second aspect, the first network device is used for controlling a serving cell of the terminal device or a residing cell of the terminal device.

In a possible implementation mode of the second aspect, the communication method further includes: transmitting, by the first network device, a downlink message to the terminal device, wherein the downlink message includes first resource information and/or first parameter information, the first resource information is used for indicating a resource occupied by the first network device for transmitting the first downlink reference signal, and the first parameter information is used for indicating parameters used by the first network device for transmitting the first downlink reference signal; and transmitting, by the first network device, the first downlink reference signal to the terminal device according to the preset uplink sequence includes: transmitting, by the first network device, the first downlink reference signal to the terminal device according to at least one of the first resource information and the first parameter information, and the preset uplink sequence.

In a possible implementation mode of the second aspect, the communication method further includes: acquiring, by the first network device, second resource information and/or second parameter information, wherein the second resource information is used for indicating a resource occupied by each of at least one second network device for transmitting the first downlink reference signal, the second parameter information is used for indicating parameters used by the each second network device for transmitting the first downlink reference signal, and the downlink message further includes the second resource information and/or the second parameter information.

In this solution, the first network device may transmit the relevant information for transmitting the downlink reference signal by the first network device together with the relevant information for transmitting the downlink reference signal by at least one second network device, thus the transmission efficiency can be improved and the probability that the terminal device misses receiving the information can be reduced.

Optionally, in a possible implementation mode of the second aspect, transmitting, by the first network device, the downlink message of the preset uplink sequence to the terminal device includes: transmitting, by the first network device, the downlink message to the terminal device when the first network device and the at least one second network device determine that the network device which is to transmit the downlink message to the terminal device is the first network device according to the location information of the terminal device and/or according to the load of the first network device and the load of the at least one second network device.

In this solution, the first network device may negotiate with the at least one second network device to determine a preferred network device to transmit the downlink message to the terminal device.

In a possible implementation mode of the second aspect, the downlink message includes indication information used for indicating the terminal device, for the terminal device in an idle state to determine that the downlink message belongs to the terminal device according to the indication information.

In this solution, through the indication by the indication information, this solution can be compatible with various states of the terminal devices, and the compatibility and extensibility of this solution are improved.

In a possible implementation mode of the second aspect, the indication information includes the preset uplink sequence or an index of the preset uplink sequence.

In this solution, the downlink message may include the preset uplink sequence, such that the terminal device may determine that the downlink message is responsive to the preset uplink sequence according to the preset uplink sequence.

In a possible implementation mode of the second aspect, the communication method further includes: receiving, by the first network device, location information transmitted by the terminal device and used for indicating a location of the terminal device, wherein the indication information includes the location information; and/or receiving, by the first network device, identification information transmitted by the terminal device and used for identifying the terminal device, wherein the indication information includes the identification information.

In this solution, the first network device transmits a corresponding downlink message to the terminal device according to the information transmitted by the terminal device, such that after the terminal device receives the downlink message, the terminal device can determine that the downlink message is responsive to the preset uplink sequence.

Optionally, in a possible implementation mode of the second aspect, receiving, by the first network device, location information transmitted by the terminal device and used for indicating the location of the terminal device and/or identification information transmitted by the terminal device and used for identifying the terminal device includes: receiving, by the first network device, an uplink message transmitted by the terminal device, wherein the uplink message includes the location information and/or the identification information.

In this solution, the first network device acquires the location information and/or the identification information by receiving a single message, and thus the signaling overhead can be decreased.

Optionally, in a possible implementation mode of the second aspect, receiving, by the first network device, the uplink message transmitted by the terminal device includes: receiving, by the first network device, the uplink message transmitted by the terminal device according to a time domain offset and/or a frequency domain offset, wherein the time domain offset includes an offset between time domain resources occupied by the preset uplink sequence and the uplink message, and the frequency domain offset includes an offset between frequency domain resources occupied by the preset uplink sequence and the uplink message.

In this solution, the resource occupied by the preset uplink sequence and the resource occupied by the uplink message have a corresponding relationship, such that the first network device can receive the second information on the corresponding resource after receiving the preset uplink sequence.

Optionally, in a possible implementation mode of the second aspect, the method further includes: acquiring, by the first network device, location information of the terminal device; and transmitting, by the first network device, the first downlink reference signal to the terminal device according to the preset uplink sequence includes: transmitting, by the first network device, the first downlink reference signal to the terminal device through beam forming.

In this solution, the first network device can realize space division multiplexing and improve spectrum utilization by acquiring the location information of the terminal device.

In a possible implementation mode of the second aspect, the communication method further includes: acquiring, by the first network device, location information of the terminal device; and transmitting, by the first network device, the first downlink reference signal to the terminal device according to the preset uplink sequence when the first network device determines to transmit the first downlink reference signal to the terminal device according to the location information of the terminal device.

The first network device may determine whether to transmit the first downlink reference signal to the terminal device according to the location information of the terminal device, and thus the meaningless transmission of the first downlink reference signal can be further avoided.

In a possible implementation mode of the second aspect, acquiring, by the first network device, the location information of the terminal device includes: acquiring, by the first network device, a receiving time point when each of multiple third network devices receives the preset uplink sequence and/or a path loss of receiving the preset uplink sequence by each of multiple fourth network devices; and determining, by the first network device, the location information of the terminal device according to the receiving time point when the each third network device receives the preset uplink sequence and/or the path loss of receiving the preset uplink sequence by the each fourth network device receives the preset uplink sequence.

In this solution, the first network device may determine the location information of the terminal device by interacting with multiple third network devices. This solution is simple to operate and easy to implement, and has good compatibility and extensibility.

In a possible implementation mode of the second aspect, before the first network device receives the preset uplink sequence, the communication method further includes: transmitting, by the first network device, the first downlink reference signal at a first density; and the preset uplink sequence is specifically used for triggering the network device which receives the preset uplink sequence to transmit the first downlink reference signal at a second density, and transmitting, by the first network device, the first downlink reference signal to the terminal device according to the preset uplink sequence includes: transmitting, by the first network device, the first downlink reference signal at the second density according to the preset uplink sequence, wherein the second density is greater than the first density.

In this solution, the first network device may firstly transmit the sparse first downlink reference signals, such that the terminal device may perform rough channel estimation according to the sparse first downlink reference signals, and the first network device may transmit the dense first downlink reference signals after receiving the preset uplink sequence, such that the terminal device can perform accurate operation according to the dense first downlink reference signals. This solution can decrease system resources occupied by the first downlink reference signal and improve the resource utilization.

In a possible implementation mode of the second aspect, the first downlink reference signal includes a downlink common reference signal; or the first downlink reference signal includes a downlink reference signal used for the terminal device to perform analog beam forming.

In this solution, the first network device may transmit the corresponding first downlink reference signal to the terminal device according to the demand of the terminal device, and thus the meaningless transmission of the downlink reference signals can be decreased.

In a possible implementation mode of the second aspect, before the first network device transmits the first downlink reference signal to the terminal device according to the preset uplink sequence, the method further includes: determining, by the first network device, that the downlink reference signal to be transmitted to the terminal device is the first downlink reference signal according to a resource for transmitting the preset uplink sequence and/or a format of the preset uplink sequence, and/or determining that the first downlink reference signal is to be transmitted at the second density.

In this solution, the first network device may determine the content triggered by the preset uplink sequence according to the resource occupied by the preset uplink sequence and/or the format of the uplink sequence. This method has high flexibility, and has good compatibility and extensibility.

Implementations of the present disclosure will be described below in detail in combination with specific examples. It shall be understood that these examples are intended only to help one skilled in the art to better understand the implementations of the present disclosure, but not to limit the scope of the implementations of the present disclosure.

It shall also be understood that, in the implementations of the present disclosure, network devices numbered "first", "second", "third" and the like are used to distinguish network devices performing different operations. Whether the first network device, the second network device and the third network device are the same network device is determined according to the actual situation.

It shall also be understood that "at least one" in the implementations of the present disclosure refers to "one or more".

The communication methods for transmitting signals in implementations of the present disclosure will be described below in detail with reference to FIG. 1 and FIG. 2.

FIG. 1 illustrates a schematic flowchart of a communication method according to an implementation of the present disclosure. FIG. 1 illustrates acts or operations of the communication method 100, but these acts or operations are only illustrative, and in the implementations of the present disclosure, other operations or variations of the operations in FIG. 1 may also be performed. In addition, the acts in FIG. 1 may be performed in a different sequence than that presented in FIG. 1, and not all of the acts in FIG. 1 may be performed. The communication method 100 may include the following acts S110 and S120.

FIG. 1 illustrates a schematic flowchart of a communication method according to an implementation of the present disclosure. As illustrated in FIG. 1, the communication method 100 may include the following acts S110 and S120.

In S110, a terminal device transmits a preset uplink sequence, the preset uplink sequence is used for triggering a network device which receives the preset uplink sequence to transmit a first downlink reference signal.

In S120, the terminal device receives the first downlink reference signal transmitted by at least one first network device according to the preset uplink sequence.

Accordingly, in an implementation of the present disclosure, the terminal device may transmit an uplink sequence according to its own demand (e.g., demands of service, measurement or training), such that the terminal device may receive a first downlink reference signal transmitted by at least one first network device, meaningless reception of downlink reference signals can be decreased, thus the resource waste is decreased and the resource utilization is improved. Further, the terminal device may transmit an uplink sequence when there is a demand, such that the terminal device can acquire the first downlink reference signal in time and perform relevant operations.

It shall be understood that a network device which receives the preset uplink sequence in an implementation of the present disclosure can be understood as a network device capable of detecting (or identifying) the preset uplink sequence.

It shall also be understood that a network device that transmits the first downlink reference signal to the terminal device after receiving the uplink sequence is called as the first network device.

For sake of simplicity, "the preset uplink sequence is used for triggering the network device which receives the preset uplink sequence to transmit the first downlink reference signal" can be simplified as "the preset uplink sequence is used for triggering the first downlink reference signal".

It needs to be noted that, in an implementation of the present disclosure, the network device no longer periodically transmits the downlink reference signals, or the network device periodically transmits the downlink reference signal with smaller densities in time domain and/or frequency domain (in the related art, the network device periodically transmits the downlink reference signals with greater densities in time domain and/or frequency domain).

Herein, the downlink reference signals with smaller densities may be understood as that the network device transmits fewer downlink reference signals on a resource of a certain size, which will be described in detail later.

It needs to be noted that the preset uplink sequence (which may be understood as an uplink sequence known to multiple network devices) may mean that the resource (e.g., a location in time and/or frequency domain) for transmitting the uplink sequence and/or the adopted uplink sequence is known to multiple network devices (herein the multiple network devices may communicate with each other). This can be achieved by making agreement through protocols beforehand or coordinating between multiple network devices. For example, the resource occupied by the preset uplink sequence (such as a location in time and/or frequency domain) and/or the adopted uplink sequence (or sequence group) may be broadcast over a downlink broadcast channel of a network device among the multiple network devices. Based on this, a transmission mode through which the terminal device transmits the preset uplink sequence may include various modes.

For example, when the terminal device is in a connection state, the multiple network devices may include a network device in a serving cell (the network device in the serving cell is used for controlling the serving cell) and a network device in a neighboring cell of the serving cell. The terminal device may transmit the uplink sequence to the network device in its serving cell, and the network device in the neighboring cell of the serving cell may also detect (or receive) the preset uplink sequence.

For another example, when the terminal device is in an idle state, the multiple network devices may include a network device in a residing cell (the network device in the residing cell is used for controlling the residing cell) and a network device in a neighboring cell of the residing cell. The terminal device may transmit the preset uplink sequence to the network device in its current residing cell, and the network device in the neighboring cell of the residing cell may also detect the preset uplink sequence.

For another example, the terminal device may transmit the preset uplink sequence by broadcasting, such that the multiple network devices may detect the preset uplink sequence.

It needs to be noted that no matter how the terminal device transmits the uplink sequence, since the uplink sequence is known to the multiple network devices, the multiple network devices may detect the preset uplink sequence.

Therefore, a terminal device transmits to a network device A an uplink sequence used for triggering the first downlink reference signal, and the terminal device may receive not only the first downlink reference signal transmitted by the network device A, but also the first downlink reference signal transmitted by a network device in a neighboring cell of the network device A, which will be described in detail later.

Optionally, in an implementation of the present disclosure, the preset uplink sequence may be selected by the terminal device from a sequence group. The sequence group may be specified through protocols or may be notified by a network device (e.g., a network device in a serving cell or a network device in a residing cell of the terminal device) to the terminal device through a downlink broadcast channel. The sequence group may be an existing sequence group in a standard, such that the preset uplink sequence is an existing sequence selected from the existing sequence group, e.g., a preamble of a Physical Random Access Channel (PRACH). Or, the sequence group may be a sequence group specially defined. For example, according to the logical index RACH_Root_SEQUENCE (Z-C sequence), a sequence group consisting of sequences with different lengths or phases from the current PRACH preamble is obtained.

When an uplink sequence group is an existing sequence group and the preset uplink sequence is an existing sequence selected from the existing sequence group, a terminal device may transmit the existing sequence in various ways, such that a network device which receives the uplink sequence determines whether the existing sequence is used for triggering the first downlink reference signal.

As an optional example, the terminal device may transmit the existing sequence on a resource corresponding to the existing sequence used for triggering the first downlink reference signal. In other words, in an implementation of the present disclosure, a resource (e.g., a location in the time domain and/or frequency domain) for the terminal device to transmit the existing sequence is different from that for a terminal device to transmit the existing sequence in the related art. For example, the terminal device transmits the PRACH preamble on a first resource during random access, and the terminal device transmits the PRACH preamble on a second resource when triggering the first downlink reference signal. Therefore, the network device which receives the uplink sequence may distinguish between the PRACH preamble for random access and the PRACH preamble for triggering the first downlink reference signal according to the resource occupied by the existing sequence.

As an another optional example, a network device B (or multiple network devices) may configure some of existing sequences in an existing sequence group beforehand dedicated for triggering the first downlink reference signal. For example, a network device may configure N sequences in the PRACH preamble beforehand dedicated for triggering the first downlink reference signal, such that a network device which receives the uplink sequence can identify the existing sequence that is used for triggering the first downlink reference signal.

Optionally, in an implementation of the present disclosure, the preset uplink sequence may also include a preset uplink signal (which is also a sequence). The preset uplink signal may be an existing uplink signal in a standard, such as uplink Sounding Reference Signal (SRS). Or, the preset uplink signal may be a signal on the Physical Uplink Control CHannel (PUCCH), such as uplink Scheduling Request (SR). If a terminal device uses an existing uplink signal to trigger a network device to transmit the first downlink reference signal, similar to what is described above, the existing uplink signal used for triggering the first downlink reference signal is different from the existing uplink signal of the related art in the resource and/or format adopted, such that the network device which receives the existing uplink signal can identify the existing uplink signal that is used for triggering the first downlink reference signal.

Optionally, in an implementation of the present disclosure, a resource (e.g., a location in time domain and/or frequency domain) for a terminal device to transmit an uplink sequence and/or a preset uplink sequence (or sequence group) adopted is known to multiple network devices. This can be achieved by making agreement through protocols beforehand or coordinating between network devices. For example, the resource occupied by the uplink sequence (e.g., a location in time domain and/or frequency domain) and/or the preset uplink sequence (or sequence group) adopted may be broadcast over a downlink broadcast channel of a network device (e.g., a network device in a serving cell of the terminal device). Therefore, when a terminal device transmits an uplink sequence to a network device A on a given resource, a neighboring cell of the network device A may detect (or receive) the uplink sequence. Correspondingly, the neighboring cell of the network device A detects (or receives) the uplink sequence, and may transmit the first downlink reference signal to the terminal device. Therefore, the terminal device may receive not only the first downlink reference signal transmitted by the network device A, but also the first downlink reference signal transmitted by a neighboring cell of the network device A.

Optionally, in an implementation of the present disclosure, after transmitting the uplink sequence and before receiving the first downlink reference signal transmitted by the at least one first network device, the terminal device may also receive a downlink message transmitted by a second network device, the downlink message includes resource information and/or parameter information, the resource information is used for indicating a resource occupied by each of the at least one first network device for transmitting the first downlink reference signal, and the parameter information is used for indicating parameters used by the each first network device for transmitting the first downlink reference signal, such that the terminal device can correctly receive the first downlink reference signal transmitted by the at least one first network device according to the resource information and/or parameter information.

Herein, the resource may refer to a transmission resource (time domain and/or frequency domain resource) occupied by the each first network device for transmitting the first downlink reference signal; the parameters may include various types of information, such as sequence information and orthogonal cover code used. For another example, the parameters may include sequence composition information of the first downlink reference signal to be transmitted by the each first network device, etc.

When a terminal device is in a connection state, the second network device may be a network device in a serving cell of the terminal device. The terminal device in the connection state receives the downlink message transmitted by the network device in the serving cell after transmitting the preset uplink sequence. When a terminal device is in an idle state, the second network device may be a network device which is determined through negotiation by the at least one first network device to transmit the downlink message to the terminal device, and this will be described in detail in a communication method 200 in another implementation of the present disclosure.

It needs to be noted that the at least one first network device may include the second network device or may not include the second network device, which is not restricted in implementations of the present disclosure.

Optionally, in an implementation of the present disclosure, the downlink message may include other information in addition to resource information and/or parameter information.

As an optional example, the downlink message further includes indication information used for indicating the terminal device, such that the terminal device in an idle state determines that the downlink message belongs to the terminal device according to the indication information.

Specifically, when the terminal device is in an idle state, the first downlink message transmitted by the network device needs to include indication information, such that the terminal device in the idle state can determine that the first downlink message belongs to the terminal device according to the indication information. Herein, the indication information may include multiple types of information.

For example, the indication information may include an uplink sequence or an index of the uplink sequence. After receiving the first downlink message, the terminal device may determine that the first downlink message belongs to the terminal device according to the uplink sequence or the index of the uplink sequence.

For another example, when the terminal device transmits an uplink sequence, the terminal device may transmit location information used for indicating the location of the terminal device and/or identification information used for identifying the terminal device along with the uplink sequence.

When the terminal device transmits the location information, the first downlink message may include the location information. After receiving the first downlink message, the terminal device may determine that the first downlink message belongs to the terminal device according to the location information.

When the terminal device transmits the identification information, the first downlink message may include the identification information. After receiving the first line message, the terminal device may determine that the first downlink message belongs to the terminal device according to the identification information.

In other words, the first downlink message may include at least one of the uplink sequence, the index of the uplink sequence, the location information, and the identification information, such that the terminal device in an idle state determines that the first downlink message belongs to the terminal device.

Based on the description above, the downlink message may further include at least one of the parameter information, the preset uplink sequence, the identification information, and the location information, in addition to the resource information. Herein, the terminal device may determine that the downlink message is used for responding to the uplink sequence of the terminal device according to any one of the preset uplink sequence, the identification information, and the location information.

Optionally, in an implementation of the present disclosure, when a terminal device transmits an uplink sequence, the terminal device may transmit an uplink message along with the uplink sequence, and the uplink message includes location information and/or identification information of the terminal device. That is, transmitting, by the terminal device, the location information and/or identification information may include: the terminal device transmits an uplink message, wherein the uplink message includes actual location information and/or identification information.

In this solution, the terminal device may transmit the actual location information and/or the identification information through a single message, and thus the signaling overhead can be decreased.

It needs to be noted that, when the terminal device is in a connection state, even though the downlink message does not include any one of the preset uplink sequence, the identification information, and the location information, the terminal device can also determine the downlink message in response to the uplink sequence of the terminal device. Thus, optionally, in an implementation of the present disclosure, the terminal device in the connection state may not transmit the location information and/or the identification information, and the corresponding downlink message may not include the preset uplink sequence, the index of the preset uplink sequence, the identification information, or the location information.

Optionally, in an implementation of the present disclosure, the communication method further includes: the terminal device transmits location information used for indicating the location of the terminal device, for the network device which receives the preset uplink sequence to determine whether to transmit the first downlink reference signal according to the location information.

Specifically, the location information transmitted by the terminal device not only can be used for indicating the terminal device, but also can be used for the network device which receives the preset uplink sequence to determine whether to transmit the first downlink reference signal according to the location information.

Optionally, in an implementation of the present disclosure, the terminal device transmits an uplink message according to a time domain offset and/or a frequency domain offset, and the uplink message includes the location information and/or identification information. The time domain offset includes an offset between time domain resources occupied by the preset uplink sequence and the uplink message, and the frequency domain offset includes an offset between frequency domain resources occupied by the preset uplink sequence and the uplink message.

Specifically, a resource used for the terminal device to transmit the preset uplink sequence and a resource used for the terminal device to transmit the location information and/or the identification information have a corresponding relationship, such that the network device can receive at least one of the location information and the identification information, and the preset uplink sequence, transmitted by the same terminal device on corresponding resources.

It needs to be noted that the terminal device may acquire the time domain offset and/or the frequency domain offset in various ways. For example, the terminal device determines the time domain offset and/or the frequency domain offset, and the preset uplink sequence may carry information used for indicating the above-mentioned time domain offset and/or the frequency domain offset, such that the network device which receives the preset uplink sequence may receive the location information and/or the identification information according to the time domain offset and/or the frequency domain offset.

For another example, the terminal device and multiple network devices make an agreement on the time domain offset and/or the frequency domain offset beforehand. For another example, a network device B configures the time domain offset and/or the frequency domain offset to the terminal device by broadcasting. Similarly, a neighboring cell of the network device B may receive at least one of the location information and the identification information, and the preset uplink sequence, transmitted by the same terminal device on corresponding resources according to the time domain offset and/or the frequency domain offset.

In the related art, a network device periodically transmits some dense downlink reference signals (such as CRS or CSI-RS), such that a terminal device performs corresponding operations. Such a communication method will cause the first network device to transmit a large number of meaningless downlink reference signals, resulting in resource waste. In order to decrease the meaningless transmission of downlink reference signals, the terminal device may trigger the network device to transmit a corresponding downlink reference signal when the terminal device has a demand. Herein, situations where a terminal device triggers a network device to transmit the first downlink reference signal may at least include the following two situations:

(1)

As an optional implementation, a terminal device may firstly receive the first downlink reference signal transmitted by at least one third network device at a low density (e.g., a first density), and the terminal device may perform a rough operation according to the first downlink reference signal at the low density. When the terminal device has a demand, the terminal device may receive the first downlink reference signal transmitted by the at least one first network device at a high density (e.g., a second density) by transmitting the uplink sequence, and the terminal device may perform operations such as accurate channel estimation according to the first downlink reference signal at the high density.

For example, before the terminal device transmits the preset uplink sequence, the communication method further includes: the terminal device receives the first downlink reference signal transmitted by the at least one third network device at the first density; and the preset uplink sequence is specifically used for triggering the network device to transmit the first downlink reference signal at the second density. Receiving, by the terminal device, the first downlink reference signal transmitted by the at least one first network device according to the preset uplink sequence includes: the terminal device receives the first downlink reference signal transmitted by the at least one first network device at the second density, wherein the second density is greater than the first density.

It shall be understood that transmitting, by the network device, the first downlink reference signal to the terminal device at the first density may be understood as that the network device transmits fewer first downlink reference signals over a resource of a certain size, i.e., transmits sparse first downlink reference signals; and transmitting, by the network device, the first downlink reference signal to the terminal device at the second density may be understood as that the first network device transmits more first downlink reference signals over a resource of a certain size, i.e., transmits dense first downlink reference signals.

It needs to be noted that the second density may be agreed in advance or may be configured by the network device, or the uplink sequence may carry indication information used for indicating the second density, which is not restricted in the present disclosure.

It also needs to be noted that the at least one third network device and the at least one first network device may include the same network device or may not include the same network device, which is not restricted in the present disclosure.

Therefore, the terminal device can firstly receive the sparse first downlink reference signals and then receive the dense first downlink reference signals after transmitting the uplink sequence, thus the resource waste can be decreased and the resource utilization can be improved.

And in this solution, the terminal device does not need to wait for the transmission period of the first downlink reference signal, and can acquire the dense first downlink reference signals in time by transmitting the uplink sequence when there is a demand.

(2)

As another optional implementation, in order to further decrease the resources occupied by the first downlink reference signals, in a future communication system, a network device may no longer transmit the first downlink reference signal periodically, and a terminal device may, according to its own demand, transmit the preset uplink used for triggering the network device which receives the preset uplink sequence to transmit the first downlink reference signal. This communication method can further decrease the resources occupied by the network device for transmitting the first downlink reference signals, and can meet the demand of the terminal device in time.

For example, the terminal device does not need to periodically receive the first downlink reference signal, and the terminal device may receive the first downlink reference signal transmitted by at least one first network device by transmitting the preset uplink sequence used for triggering the first downlink reference signal when there is a demand.

Optionally, in an implementation of the present disclosure, the first downlink reference signal may include a downlink common reference signal, and the terminal device may transmit the uplink sequence used for triggering the network device to transmit the downlink common reference signal when a trigger condition is satisfied, herein the trigger condition includes at least one of the following conditions.

Condition 1: A receiving power for receiving a downlink signal transmitted by a fourth network device is less than a power threshold, the fourth network device is used for controlling a serving cell of the terminal device or a residing cell of the terminal device.

Specifically, the terminal device may measure the downlink signal transmitted by the fourth network device, and if the intensity of the downlink signal is less than a power threshold, the terminal device may transmit the preset uplink sequence. For example, if a Reference Signal Receiving Power (RSRP) for the terminal device to receive the downlink signal transmitted by the fourth network device is less than a power threshold (indicating that the terminal device is located at the edge of the first network device), the terminal device may transmit the uplink sequence used for triggering the network device to transit the downlink common reference signal.

It needs to be noted that, in condition 1, the situation that the receiving power for receiving the downlink signal transmitted by the fourth network device is less than the power threshold may include the situation that the receiving power for receiving the downlink common reference signal transmitted by the fourth network device at the first density is less than the power threshold. In other words, if the terminal device may receive the first downlink reference signals transmitted by multiple third network devices at the first density, the terminal device may detect the downlink common reference signal transmitted by the fourth network device at the first density, and if the receiving power for receiving the downlink common reference signal transmitted by the fourth network at the first density is less than the power threshold, the terminal device may transmit the uplink sequence used for triggering the downlink common reference signal, such that the terminal device can receive the downlink common reference signal transmitted by at least one first network device at the second density.

Condition 2: The terminal device is located in a preset area of the fourth network device.

Specifically, the preset area may be an area pre-configured by the fourth network device for the terminal device, and the preset area may be formed by some location coordinates. For example, when the coordinates of the terminal device satisfy A<x<B, C<y<D, the terminal device is located in the preset area, where (x, y) is the coordinates of the terminal device, A and B indicate a range of horizontal coordinates, and C and D indicate a range of longitudinal coordinates. Or, the location area may be composed of geographical location areas satisfying certain mathematical relations. For example, when the coordinates of the terminal device satisfy $E<(x-x_0)^2+(y-y_0)^2<F$, the terminal device is located in this preset area, wherein $(x_0, y_0)$ is the coordinates of the first network device, E and F are distance thresholds, and the preset area is a ring area around the fourth network device. The terminal device transmits the uplink sequence used for triggering the downlink common reference signal when the terminal device is located in the preset area.

Optionally, in an implementation of the present application, the fourth network device may configure the preset location to the terminal device in various ways. For example, when the terminal device is in an idle state, the fourth network device may broadcast the preset area to the terminal device. For another example, when the terminal device is in a connection state, the fourth network device may configure the preset area to the terminal device by broadcasting, or by special signaling.

In 5G, a network device may support Analog Beam Forming (ABF). In order to support analog beam forming, a terminal may need the network device to transmit a specific downlink reference signal (referred to as analog reference signal) for the purpose of training by the terminal device. The terminal device may transmit the uplink sequence used for triggering the network device to transmit the downlink analog reference signal according to the demand for performing analog beam forming by the terminal device itself.

Optionally, in an implementation of the present disclosure, according to its training demand, the terminal device may transmit the uplink sequence used for triggering the network device to transmit the downlink reference signal used by the terminal device to perform analog beam forming. In other words, the first reference signal may include the downlink reference signal used by the terminal device to perform analog beam forming.

Optionally, in an implementation of the present disclosure, the preset uplink sequence is specifically used for triggering, through a resource for transmitting the preset uplink sequence and/or the preset uplink sequence included in preset uplink sequences, the network device to transmit the first downlink reference signal, and/or triggering the network device to transmit the first downlink reference signal at the second density.

For example, it may be agreed or configured beforehand by the network device that, the preset uplink sequence transmitted on a first resource is used for triggering the network device to transmit the downlink common reference signal; the preset uplink sequence transmitted on a second resource is used for triggering the network device to transmit an analog reference signal; and the preset uplink sequence transmitted on a third resource is used for triggering the network device to transmit a current downlink reference signal at a second density. The terminal device may transmit the uplink sequence on the corresponding resource according to its own demand, such that the network device which receives the preset uplink sequence can determine which type of downlink reference signal is to be transmitted and/or how to transmit the downlink reference signal according to the resource for transmitting the preset uplink sequence.

For another example, it may be agreed or configured beforehand that, a preset first uplink sequence is used for triggering a network device to transmit the downlink common reference signal; a preset second uplink sequence is used for triggering a network device to transmit an analog reference signal; and a preset third uplink sequence is used for triggering a network device to transmit a current downlink reference at a second density. The terminal device may transmit the corresponding preset uplink sequence according to its own demand, such that the network device can determine which type of downlink reference signal is to be transmitted and/or how to transmit the downlink reference signal according to the preset uplink sequence.

A communication method according to an implementation of the present disclosure has been described above, a terminal device may transmit an uplink sequence used for triggering a first downlink reference signal and receive the first downlink reference signal transmitted by at least one first network device. A communication method according to another implementation of the present disclosure will be described below.

FIG. 2 illustrates a schematic flowchart of a communication method 200 according to another implementation of the present disclosure. FIG. 2 illustrates acts or operations of the communication method 200, but these acts or operations are only examples, and in an implementation of the present disclosure, other operations or variations of the operations shown in FIG. 2 may also be performed. In addition, the acts in FIG. 2 may be performed in an order different from the order presented in FIG. 2, and not all of the acts in FIG. 2 may be performed. The communication method 200 may include the following acts S210 and S220.

In S210, a first network device receives a preset uplink sequence transmitted by a terminal device, and the preset uplink sequence is used for triggering a network device which receives the preset uplink sequence to transmit a first downlink reference signal.

In S220, the first network device transmits the first downlink reference signal to the terminal device according to the preset uplink sequence.

Therefore, the first network device may transmit the corresponding first downlink reference signal to the terminal device when the terminal device has a demand, and meaningless transmission of the first downlink reference signal can be decreased, thus the resource waste can be decreased and the resource utilization can be improved. Further, after receiving the uplink sequence, the first network device may transmit the first downlink reference signal in time, such that the terminal device can perform relevant operations according to the first downlink reference signal in time, on the basis of decreasing the resource waste, the demand of acquiring the first downlink reference by the terminal device can be satisfied.

It shall be noted that the network device which receives the uplink sequence may transmit the first downlink reference signal according to the uplink sequence (see the relevant description in the communication method 100 above). In other words, the first network device may be a serving cell (or residing cell) of the terminal device, or a neighboring cell of the serving cell (or residing cell) of the terminal device. Relevant operations of the first network device after receiving the uplink sequence may be referred to for relevant operations of another network device which receives the uplink sequence, which are not repeated in the present disclosure for sake of conciseness.

It also needs to be noted that the transmission mode through which the first network device transmits the first downlink reference signal to the terminal device may include various modes. For example, the first network device may transmit the first downlink reference signal to the terminal device by broadcasting or unicasting, and the transmission mode through which the first network device specifically transmits the first downlink reference signal to the terminal device is not restricted in the present disclosure.

Optionally, in an implementation of the present disclosure, based on protocol or network configuration, an implementation 220 of the present disclosure may include following two situations.

Situation 1

As long as the uplink sequence is received, the first network device will transmit the first downlink reference signal to the terminal device.

Situation 2

After receiving the uplink sequence, the first network device determines whether to transmit the first downlink reference signal. In other words, when the first network device receives the uplink sequence and determines to transmit the first downlink reference signal to the terminal device, the first network device transmits the first downlink reference signal to the terminal device according to the uplink sequence.

As an optional example of the present disclosure, transmitting, by the first network device, the first downlink reference signal to the terminal device according to the preset uplink sequence includes: the first network device acquires location information of the terminal device; and when the first network device determines to transmit the first downlink reference signal to the terminal device according to the location information of the terminal device, the first network device transmits the first downlink reference signal to the terminal device according to the preset uplink sequence.

Specifically, the first network device may determine whether to transmit the first downlink reference signal to the terminal device according to the location information of the terminal device. For example, the first network device may determine that the terminal device is closer to the first network device according to the location information of the terminal device, and thereby determine to transmit the first downlink reference signal to the terminal device. Similarly, another network device which receives the preset uplink sequence may also determine whether to transmit the first downlink reference signal to the terminal device according to the location information.

Herein, the first network device may acquire the location information of the terminal device at least in following several ways.

As an optional implementation, the first network device may determine the location information of the terminal device by acquiring a receiving time point when each of multiple third network devices receives the preset uplink sequence.

Optionally, the first network device may determine the location information according to the receiving time point when the first network device receives the preset uplink sequence and path losses of receiving the preset uplink sequence by multiple third network devices.

For example, if the first network device and two third network devices perform time interaction, assuming that the coordinates of a first network device A are $(a_1, b_1)$, the coordinates of a third network device B are $(a_2, b_2)$, and the coordinates of a third network device C are $(a_3, b_3)$, a receiving time difference between a receiving time point when A receives the preset uplink sequence and a receiving time point when B receives the preset uplink sequence is $\Delta t_1$, and a receiving time difference between the receiving time point when A receives the uplink sequence and a receiving time point when C receives the uplink sequence is $\Delta t_2$, and assuming that a location of the terminal device is $(x, y)$, and a duration used by the first network device to receive the uplink sequence is $t_1$, the first network device may determine the location information of the terminal device according to formulas (1) to (3).

$$\sqrt{(a_1-x)^2+(b_1-y)^2}=t_1 v; \quad (1)$$

$$\sqrt{(a_2-x)^2+(b_2-y)^2}=(t_1+\Delta t_1)v; \quad (2)$$

$$\sqrt{(a_3-x)^2+(b_3-y)^2}=(t_1+\Delta t_2)v; \quad (3)$$

wherein $v=3.0 \cdot 10^8$ m/s. The first network device may determine the location information of the terminal device according to the above formulas (1) to (3). Similarly, another network device which receives the uplink sequence may determine the location information of the terminal device by the same way, such that whether to transmit the first downlink reference signal to the terminal device can be determined according to the location information of the terminal device.

As another optional implementation, the first network device may determine the location information of the terminal device by acquiring a path loss of receiving the preset uplink sequence by each of multiple fourth network devices.

Optionally, the first network device may determine the location information according to the path loss of receiving the preset uplink sequence by the first network device and the path loss of receiving the preset uplink sequence by the each fourth network device.

Herein, the path loss of receiving the uplink sequence by any network device is equal to a power difference between a receiving power of that network device for receiving the uplink sequence and a transmitting power of the terminal device for transmitting the uplink sequence. The first network device may determine the location information of the terminal device according to path losses of receiving the uplink sequence by a fourth network device D, a fourth network device E and a fourth network device F.

It needs to be noted that the transmitting power of the uplink sequence is known to multiple network devices, such that the network devices in the network system can determine the path loss of the uplink sequence according to the transmitting power of the preset uplink sequence and the receiving power of the preset uplink sequence. For example, the first network device may transmit power information used for indicating the transmitting power of the uplink sequence to the terminal device. For another example, the first network device may broadcast the power information through a broadcast message. For still another example, the transmitting power of the uplink sequence may also be agreed beforehand by the terminal device and the multiple network devices, such that the terminal device may transmit the uplink sequence according to the agreed transmitting power. Correspondingly, after receiving the power information, the terminal device may transmit the uplink sequence by using the transmitting power indicated by the power information.

As another optional implementation, acquiring, by the first network device, the location information of the terminal device may include: the first network device receives the location information transmitted by the terminal device.

Therefore, the network device which receives the preset uplink sequence may transmit the first downlink reference signal when it determines to transmit the first downlink reference signal to the terminal device according to the location information of the terminal device.

It needs to be noted that whether the network device which receives the uplink sequence transmits the first downlink reference signal may be related to information such as load in addition to the location information, and specifically it is related to the implementation of the network device. Therefore, in implementations of the present disclosure, what is described is that the network device transmits the first downlink reference signal when it determines to transmit the first downlink reference signal according to the location information.

Optionally, in an implementation of the present disclosure, after the first network device acquires the location information, the first network device may transmit the first downlink reference signal to the terminal device through beam forming, thus the space division multiplexing can be realized and the spectrum utilization can be improved.

Optionally, in an implementation of the present disclosure, the communication method may further include: the first network device transmits a downlink message to the terminal device, the downlink message includes first resource information and/or first parameter information, the first resource information is used for indicating a resource occupied by the first network device for transmitting the first downlink reference signal, and the first parameter information is used for indicating parameters used by the first network device for transmitting the first downlink reference signal. Transmitting, by the first network device, the first downlink reference signal to the terminal device according to the preset uplink sequence includes: the first network device transmits the first downlink reference signal to the terminal device according to at least one of the first resource information and the first parameter information, and the preset uplink sequence.

The downlink message may include a physical layer message transmitted through a Physical Downlink Control Channel (PDCCH) or a message transmitted through Radio Resource Control (RRC), by the first network device.

Optionally, in an implementation of the present disclosure, the communication method further includes: the first network device acquires second resource information and/or second parameter information, the second resource information is used for indicating a resource occupied by each of at least one second network device for transmitting the first downlink reference signal, the second parameter information is used for indicating parameters used by the each second network device for transmitting the first downlink reference signal, and the downlink message further includes the second resource information and/or the second parameter information.

Specifically, as described above, not only can the first network device transmit the first downlink reference signal to the terminal device according to the uplink sequence, but also the neighboring cell of the first network device can transmit the first downlink reference signal to the terminal device according to the uplink sequence. The first network device may transmit the first resource information, the first parameter information, the second resource information, and the second parameter information to the terminal device through the downlink message, such that the terminal device may receive the first downlink reference signals transmitted by the first network device and at least one second network device on the corresponding resources according to the downlink message.

As an optional example of the present disclosure, when the terminal device is in an idle state, the first network device may negotiate with at least one second network device to select a network device for transmitting the downlink message to the terminal device. For example, it may be negotiated that the network device which is closest to the location of the terminal device transmits the downlink message to the terminal device. Further, if the load of the network device which is closest to the location of the terminal device is heavy, a network device closer to the location of the terminal device and with lighter load may be selected to transmit the downlink message of the uplink sequence to the terminal device. When the first network device and the at least one second network device determine that the network device which is to transmit the downlink message to the terminal device is the first network device according to the location information of the terminal device and/or the load of the first network device and the load of the at least one second network device, the first network device transmits the downlink message to the terminal device according to the preset uplink sequence.

As an optional implementation, the downlink message may further include parameter information. The first network device and the at least one second network device may transmit the first downlink reference signal to the terminal by using corresponding parameters on corresponding resources. The terminal device will measure these first downlink reference signals and perform mobility management, such as various reporting and measurement related to handover, and operations in possible handover processes.

As an optional example, the downlink message may further include at least one of the identification information used for identifying the terminal device, the location information used for indicating the terminal device, and the preset uplink sequence, such that the terminal device can determine that the downlink message is responsive to the uplink sequence. Relevant description of the above-mentioned communication method 100 may be referred to for the specific description, which is not repeated herein for sake of conciseness.

It needs to be noted that the first network device in the communication method 200 may correspond to a first network device out of at least one first network device in the communication method 100. Relevant description in the communication method 100 may be referred to for the specific description of certain actions or limitations (a preset uplink sequence, a first density, a second density, etc.) of the communication method 200, which is not repeated herein for sake of conciseness.

Accordingly, in the communication method in an implementation of the present disclosure, the terminal device may transmit a preset uplink sequence when the terminal device has a demand, such that the network device which receives the preset uplink sequence may transmit the first downlink reference signal to the terminal based on the demand of the terminal, thus meaningless transmission of downlink reference signals can be decreased and the resource utilization can be improved.

The communication methods in implementations of the present disclosure have been described above with reference to FIG. 1 and FIG. 2. The communication apparatuses and communication devices in implementations of the present disclosure will be described below with reference to FIG. 3 and FIG. 4.

FIG. 3 illustrates a schematic diagram of a communication apparatus 300 according to an implementation of the present disclosure. As illustrated in FIG. 3, the communication apparatus 300 is a terminal device and the communication apparatus 300 includes a transmitting module 310 and a receiving module 320.

The transmitting module 310 is configured to transmit a preset uplink sequence, wherein the preset uplink sequence is used for triggering a network device which receives the preset uplink sequence to transmit a first downlink reference signal.

The receiving module 320 is configured to receive the first downlink reference signal transmitted by at least one first network device according to the preset uplink sequence.

Optionally, the receiving module 320 is further configured to receive a downlink message transmitted by a second network device, the downlink message includes resource information and/or parameter information, the resource information is used for indicating a resource occupied by each of the at least one first network device for transmitting the first downlink reference signal, and the parameter information is used for indicating parameters used by the each first network device for transmitting the first downlink reference signal.

The receiving module 320 is specifically configured to receive the first downlink reference signal transmitted by the at least one first network device according to the resource information and/or parameter information.

Optionally, the downlink message further includes indication information used for indicating the terminal device, for the terminal device in an idle state to determine that the downlink message belongs to the terminal device according to the indication information.

Optionally, the indication information includes the preset uplink sequence or an index of the preset uplink sequence.

Optionally, the transmitting module 310 is further configured to: transmit location information used for indicating a location of the terminal device, wherein the indication information includes the location information; and/or transmit identification information used for identifying the terminal device, wherein the indication information includes the identification information.

Optionally, the receiving module 320 is further configured to receive the first downlink reference signal transmitted by at least one third network device at a first density; the preset uplink sequence is specifically used for triggering the network device which receives the preset uplink sequence to transmit the first downlink reference signal at a second density.

The receiving module 320 is specifically configured to receive the first downlink reference signal transmitted by the at least one first network device at the second density according to the preset uplink sequence, the second density is greater than the first density.

Optionally, the transmitting module 310 is further configured to transmit location information used for indicating the location of the terminal device, for the network device which receives the preset uplink sequence to determine whether to transmit the first downlink reference signal according to the location information.

Optionally, the transmitting module 310 is specifically configured to, when a trigger condition is satisfied, transmit the preset uplink sequence used for triggering the network device which receives the preset uplink sequence to transmit a downlink common reference signal, wherein the trigger condition includes at least one of the following conditions: a receiving power used by the receiving module 320 for receiving a downlink signal transmitted by a fourth network device is less than a power threshold, the fourth network device is used for controlling a serving cell of the terminal device or a residing cell of the terminal device; and the communication apparatus is located in a preset area of the fourth network device.

Optionally, the first downlink reference signal includes a downlink reference signal used for the terminal device to perform analog beam forming.

Optionally, the preset uplink sequence is specifically used for triggering, through a resource for transmitting the preset uplink sequence and/or a format of the preset uplink sequence, the network device which receives the preset uplink sequence to transmit the first downlink reference signal, and/or triggering the network device which receives the preset uplink sequence to transmit the first downlink reference signal at the second density.

It shall be understood that the communication apparatus 300 is embodied in a form of functional modules. The term "module" may refer to an Application Specific Integrated Circuit (ASIC), an electronic circuit, a processor (such as a shared processor, a proprietary processor or a group processor) for executing one or more software or firmware programs, a memory, a merged logic circuit, and/or other suitable components supporting the described functions. In an optional example, one skilled in the art can understand that the communication apparatus 300 may be specifically a terminal device in the communication methods of the above-mentioned implementations, and the communication apparatus 300 may be used for executing various processes and/or acts corresponding to the terminal device in the above-mentioned method implementations, which is not repetitively described herein for sake of avoiding repetition.

FIG. 4 illustrates a schematic diagram of a communication apparatus 400 according to another implementation of the present disclosure. As illustrated in FIG. 4, the communication apparatus 400 is a first network device and the communication apparatus 400 includes a receiving module 410 and a transmitting module 420.

The receiving module 410 is configured to receive a preset uplink sequence transmitted by a terminal device, wherein the preset uplink sequence is used for triggering the network device which receives the preset uplink sequence to transmit a first downlink reference signal.

The transmitting module 420 is configured to transmit the first downlink reference signal to the terminal device according to the preset uplink sequence.

Optionally, the transmitting module 420 is further configured to transmit a downlink message to the terminal device, the downlink message includes first resource information and/or first parameter information, the first resource information is used for indicating a resource occupied by the first network device for transmitting the first downlink reference signal, and the first parameter information is used for indicating parameters used by the first network device for transmitting the first downlink reference signal; and the transmitting module 420 is specifically configured to transmit the first downlink reference signal to the terminal device according to at least one of the first resource information and the first parameter information, and the preset uplink sequence.

Optionally, the communication apparatus 400 further includes: a first processing module configured to acquire second resource information and/or second parameter information, wherein the second resource information is used for indicating a resource occupied by each of at least one second network device for transmitting the first downlink reference signal, the second parameter information is used for indicating parameters used by the each second network device for transmitting the first downlink reference signal, and the downlink message further includes the second resource information and/or the second parameter information.

Optionally, the downlink message includes indication information used for indicating the terminal device, for the terminal device in an idle state to determine that the downlink message belongs to the terminal device according to the indication information.

Optionally, the indication information includes the preset uplink sequence or an index of the preset uplink sequence.

Optionally, the receiving module 410 is further configured to: receive location information transmitted by the terminal device and used for indicating a location of the terminal device, wherein the indication information includes the location information; and/or receive identification information transmitted by the terminal device and used for identifying the terminal device, wherein the indication information includes the identification information.

Optionally, the communication apparatus 400 further includes: a second processing module configured to acquire location information of the terminal device; and the transmitting module 420 is specifically configured to, when the second processing module determines to transmit the first downlink reference signal to the terminal device according to the location information of the terminal device, transmit the first downlink reference signal to the terminal device according to the preset uplink sequence.

Optionally, the second processing module is specifically configured to: acquire a receiving time point when each of multiple third network devices receives the preset uplink sequence and/or a path loss of receiving the preset uplink sequence by each of multiple fourth network devices; and determine the location information of the terminal device according to the receiving time point when the each third network device receives the preset uplink sequence and/or the path loss of receiving the preset uplink sequence by the each fourth network device.

Optionally, before the receiving module 410 receives the preset uplink sequence, the transmitting module 420 is further configured to transmit the first downlink reference signal at a first density; the preset uplink sequence is specifically used for triggering the network device which receives the preset uplink sequence to transmit the first downlink reference signal at a second density; and the transmitting module 420 is specifically configured to transmit the first downlink reference signal at the second density according to the preset uplink sequence, the second density is greater than the first density.

Optionally, the first downlink reference signal includes a downlink common reference signal; or the first downlink reference signal includes a downlink reference signal used for the terminal device to perform analog beam forming.

Optionally, the communication apparatus 400 further includes: a third processing module configured to determine that the downlink reference signal to be transmitted to the terminal device is the first downlink reference signal according to a resource for transmitting the preset uplink sequence and/or a format of the preset uplink sequence, and/or determine that the first downlink reference signal is to be transmitted at the second density.

It shall be understood that the communication apparatus 400 is embodied in a form of functional modules. The term "module" may refer to an Application Specific Integrated Circuit (ASIC), an electronic circuit, a processor (such as a shared processor, a proprietary processor or a group processor) for executing one or more software or firmware programs, a memory, a merged logic circuit, and/or other suitable components supporting the described functions. In an optional example, one skilled in the art can understand that the communication apparatus 400 may be specifically a first network device in the communication method of the above-mentioned implementations, and the communication apparatus 400 may be used for executing various processes and/or acts corresponding to the first network device in the above-mentioned method implementations, which is not repetitively described herein for sake of avoiding repetition.

Figure 5:
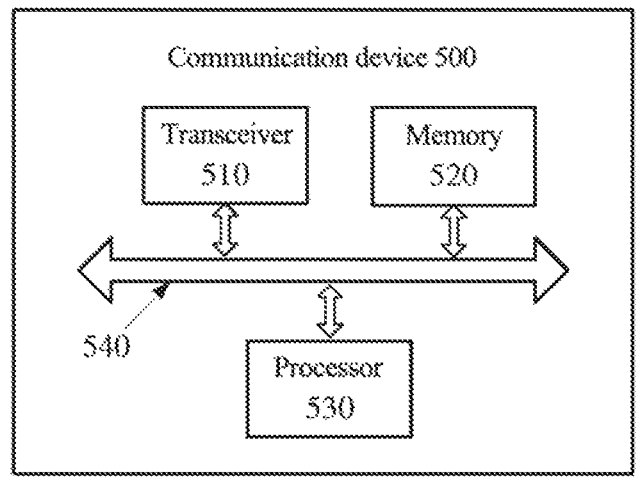
FIG. 5 illustrates a schematic diagram of a communication apparatus according to an implementation of the present disclosure.

FIG. 5 illustrates a schematic diagram of a communication device 500 according to an implementation of the present disclosure. As illustrated in FIG. 5, the communication device 500 is a terminal device, and the communication device 500 includes: a transceiver 510, a memory 520 and a processor 530. The memory 520 is used for storing program instructions. The processor 530 may call the program instructions stored in the memory 520. The processor 530 may control the transceiver 510 to receive or transmit information, and optionally, the terminal device 500 further includes a bus system 540 that interconnects the processor 530, the memory 520, and the transceiver 510.

The transceiver 510 is configured to transmit a preset uplink sequence, wherein the preset uplink sequence is used for triggering a network device which receives the preset uplink sequence to transmit a first downlink reference signal; and receive the first downlink reference signal transmitted by at least one first network device according to the preset uplink sequence.

Optionally, the transceiver 510 is further configured to receive a downlink message transmitted by a second network device, the downlink message includes resource information and/or parameter information, the resource information is used for indicating a resource occupied by each of the at least one first network device for transmitting the first downlink reference signal, and the parameter information is used for indicating parameters used by the each first network device for transmitting the first downlink reference signal.

The transceiver 510 is specifically configured to receive the first downlink reference signal transmitted by the at least one first network device according to the resource information and/or parameter information.

Optionally, the downlink message further includes indication information used for indicating the terminal device, for the terminal device in an idle state to determine that the downlink message belongs to the terminal device according to the indication information.

Optionally, the indication information includes the preset uplink sequence or an index of the preset uplink sequence.

Optionally, the transceiver 510 is further configured to transmit location information used for indicating a location of the terminal device, wherein the indication information includes the location information; and/or transmit identification information used for identifying the terminal device, wherein the indication information includes the identification information.

Optionally, the transceiver 510 is further configured to receive the first downlink reference signal transmitted by at least one third network device at a first density; the preset uplink sequence is specifically used for triggering the network device which receives the preset uplink sequence to transmit the first downlink reference signal at a second density, and the transceiver 510 is specifically configured to receive the first downlink reference signal transmitted by the at least one first network device at the second density according to the preset uplink sequence, the second density is greater than the first density.

Optionally, the transceiver 510 is specifically configured to, when a trigger condition is satisfied, transmit the preset uplink sequence used for triggering the network device which receives the preset uplink sequence to transmit a downlink common reference signal, wherein the trigger condition includes at least one of the following conditions: a receiving power used by the transceiver 510 for receiving a downlink signal transmitted by a fourth network device is less than a power threshold, the fourth network device is used for controlling a serving cell of the terminal device or a residing cell of the terminal device; and the communication device 500 is located in a preset area of the fourth network device.

Optionally, the first downlink reference signal includes a downlink reference signal used for the terminal device to perform analog beam forming.

Optionally, the preset uplink sequence is specifically used for triggering, through a resource for transmitting the preset uplink sequence and/or a format of the preset uplink sequence, the network device which receives the preset uplink sequence to transmit the first downlink reference signal, and/or triggering the network device which receives the preset uplink sequence to transmit the first downlink reference signal at the second density.

Optionally, the transceiver 510 is further configured to transmit location information used for indicating the location of the terminal device, for the network device which receives the preset uplink sequence to determine whether to transmit the first downlink reference signal according to the location information.

It shall be understood that the communication device 500 may be specifically a terminal device in the above-mentioned implementations and may be used for executing various acts and/or processes corresponding to the terminal device in the above-mentioned method implementations. Optionally, the memory 520 may include a read-only memory and a random access memory, and provide instructions and data to the processor. A part of the memory may also include a non-volatile random access memory. For example, the memory may also store information about device types. The processor 530 may be used for executing the instructions stored in the memory, and when the processor executes the instructions, the processor may execute the acts corresponding to the first network device in the above-mentioned method implementations.

Figure 6:
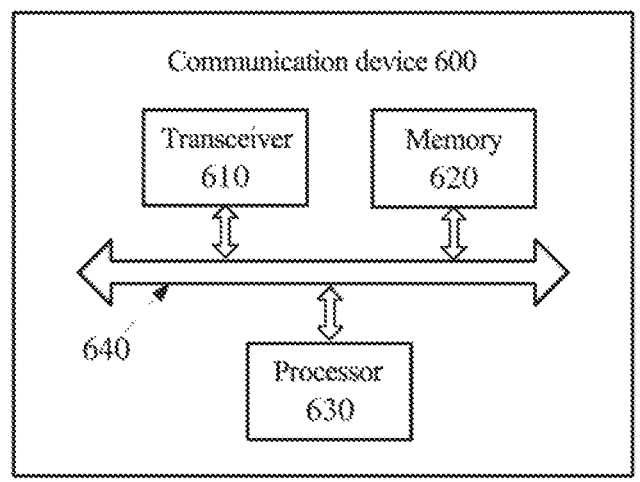
FIG. 6 illustrates a schematic diagram of a communication apparatus according to another implementation of the present disclosure.

FIG. 6 illustrates a schematic diagram of a communication device 600 according to another implementation of the present disclosure. As illustrated in FIG. 6, the communication device is a first network device and the communication device includes: a transceiver 610, a memory 620 and a processor 630. The memory 620 is used for storing program instructions. The processor 630 may call the program instructions stored in the memory 620. The processor 630 may control the transceiver 610 to receive or transmit information, and optionally, the communication device 600 further includes a bus system 640 that interconnects the processor 630, the memory 620, and the transceiver 610.

The transceiver 610 is configured to receive a preset uplink sequence transmitted by a terminal device, wherein the preset uplink sequence is used for triggering a network device which receives the preset uplink sequence to transmit a first downlink reference signal; and transmit the first downlink reference signal to the terminal device according to the preset uplink sequence.

Optionally, the transceiver 610 is further configured to transmit a downlink message to the terminal device, the downlink message includes first resource information and/or first parameter information, the first resource information is used for indicating a resource occupied by the first network device for transmitting the first downlink reference signal, and the first parameter information is used for indicating parameters used by the first network device for transmitting the first downlink reference signal; and the transceiver 610 is specifically configured to transmit the first downlink reference signal to the terminal device according to at least one of the first resource information and the first parameter information, and the preset uplink sequence.

Optionally, the processor 630 is further configured to acquire second resource information and/or second parameter information, the second resource information is used for indicating a resource occupied by each of at least one second network device for transmitting the first downlink reference signal, the second parameter information is used for indicating parameters used by the each second network device for transmitting the first downlink reference signal, and the downlink message further includes the second resource information and/or the second parameter information.

Optionally, the downlink message includes indication information used for indicating the terminal device, for the terminal device in an idle state to determine that the downlink message belongs to the terminal device according to the indication information.

Optionally, the indication information includes the preset uplink sequence or an index of the preset uplink sequence.

Optionally, the transceiver 610 is further configured to receive location information transmitted by the terminal device and used for indicating a location of the terminal device, wherein the indication information includes the location information; and/or receive identification information transmitted by the terminal device and used for identifying the terminal device, wherein the indication information includes the identification information.

Optionally, the processor 630 is further configured to acquire location information of the terminal device; and the transceiver 610 is specifically configured to, when the second processor determines to transmit the first downlink reference signal to the terminal device according to the preset uplink sequence and the location information of the terminal device, transmit the first downlink reference signal to the terminal device according to the preset uplink sequence.

Optionally, the processor 630 is further configured to acquire a receiving time point when each of multiple third network devices receives the preset uplink sequence and/or a path loss of receiving the preset uplink sequence by each of multiple fourth network devices; and determine the location information of the terminal device according to the receiving time point when the each third network device receives the preset uplink sequence and/or the path loss of receiving the preset uplink sequence by the each fourth network device.

Optionally, before the transceiver 610 receives the preset uplink sequence, the transceiver 610 is further configured to transmit the first downlink reference signal at a first density; and the preset uplink sequence is specifically used for triggering the network device which receives the preset uplink sequence to transmit the first downlink reference signal at a second density, and the transceiver 610 is specifically configured to transmit the first downlink reference signal at the second density according to the preset uplink sequence, the second density is greater than the first density.

Optionally, the first downlink reference signal includes a downlink common reference signal; or the first downlink reference signal includes a downlink reference signal used for the terminal device to perform analog beam forming.

Optionally, the processor 630 is further configured to determine that the downlink reference signal to be transmitted to the terminal device is the first downlink reference signal according to a resource for transmitting the preset uplink sequence and/or a format of the preset uplink sequence, and/or determine that the first downlink reference signal is to be transmitted at the second density.

It shall be understood that the communication device 600 may be specifically a first network device in the above-mentioned implementations and may be used for executing various acts and/or processes corresponding to the first network device in the above-mentioned method implementations. Optionally, the memory 620 may include a read-only memory and a random access memory, and provide instructions and data to the processor. A part of the memory may also include a non-volatile random access memory. For example, the memory may also store information about device types. The processor 630 may be used for executing the instructions stored in the memory, and when the processor executes the instructions, the processor may execute the acts corresponding to the first network device in the above-mentioned method implementations.

In an implementation of the present disclosure, the processor may be a Central Processing Unit (CPU), a Network Processor (NP), or a combination of CPU and NP. The processor may further include hardware chips. The above-mentioned hardware chips may be Application-Specific Integrated Circuits (ASICs), programmable logic devices (PLDs) or a combination thereof. These PLDs may be complex programmable logic de vices (CPLDs), Field-Programmable Gate Arrays (FPGAs), Generic Array Logic (GAL), or any combination thereof.

The transceiver can realize communication between mobile terminal devices and other devices or communication networks.

The memory may include a read-only memory and a random access memory, and provide instructions and data to the processor. A part of the processor may also include a non-volatile random access memory. For example, the processor may also store information about device types.

The bus system includes not only a data bus, but also a power bus, a control bus and a state signal bus. For convenience of description, only one bold line is used to represent the bus system, but it does not imply that there is only one bus or one type of bus.

It shall be understood that, in an implementation of the present disclosure, "B corresponding to A" means that B is associated with A, and B can be determined according to A. However, it shall be understood that determining B according to A means determining B not only according to A, but also according to A and/or other information. It shall be understood that the term "and/or" herein is merely a description of the association relationship between associated objects, indicating that there may be three kinds of relationships, and for example, A and/or B may represent that A exists alone, A and B exist at the same, and B exists alone. In addition, the symbol "/" herein generally indicates that objects before and after the symbol are in an "or" relationship.

It shall also be understood that, in various implementations of the present disclosure, the value of a sequence number in the above-mentioned processes does not imply an order of execution, and an order of execution of each process should be determined by its function and inherent logic, and should not constitute any limitation on an implementation process of the implementation of the present disclosure.

Those of ordinary skill in the art will recognize that the exemplary elements and algorithm acts described in connection with the implementations disclosed herein can be implemented in electronic hardware, or a combination of computer software and electronic hardware. Whether these functions are implemented in hardware or software depends on the specific application and design constraints of the technical solution. Skilled artisan may use different methods to implement the described functions for each particular application, but such implementation should not be considered to be beyond the scope of the present disclosure.

Those skilled in the art can clearly understand that for convenience and conciseness of description, corresponding processes in the aforementioned method implementations may be referred to for the specific working processes of the system, apparatus, and unit described above, which are not repeated here.

In several implementations provided by the present disclosure, it should be understood that the disclosed system, apparatus and method may be implemented in other ways. For example, the apparatus implementations described above are only illustrative, for example, the categorization of the units is only a logical function categorization, and there may be other categorization modes in actual implementation. For example, multiple units or components may be combined or integrated into another system, or some features may be ignored or not executed. On the other hand, the mutual coupling or direct coupling or communication connection shown or discussed may be indirect coupling or communication connection through some interfaces, apparatuses or units, and may be electrical, mechanical or in other forms.

The unit described as a separate unit may or may not be physically separate, and the unit shown as a unit may or may not be a physical unit, i.e., may be located in one place or may be distributed over multiple network units. Some or all of the elements can be selected according to actual needs to achieve the purpose of the implementation.

In addition, various functional units in various implementations of the present disclosure may be integrated into one processing unit, may be physically present in each unit alone, or two or more units may be integrated into one unit.

In order to make the application document concise and clear, the technical features and description in a certain aforementioned implementation can be understood as applicable to other implementations, e.g., the technical features of the method implementations can be applied to the apparatus implementations or other method implementations, which will not be repeated in other implementations one by one.

The functions may be stored in a computer readable storage medium if implemented in the form of software functional units and sold or used as separate products. Based on this understanding, the technical solution of the present disclosure, in essence, or the part contributing to the related art, or the part of the technical solution, may be embodied in the form of a software product stored in a storage medium, including several instructions for causing a computer device (which may be a personal computer, a server, or a network device, etc.) to perform all or part of the acts of the method described in various implementations of the present disclosure. The aforementioned storage media include U disk, mobile hard disk, read-only memory (ROM), random access memory (RAM), magnetic disk or optical disk, and other media capable of storing program codes.

The foregoing are merely exemplary implementations of the present disclosure, but the protection scope of the present disclosure is not limited thereto. Any person skilled in the art can easily conceive changes or substitutions within the technical scope disclosed by the present disclosure, which should be included within the protection scope of the present disclosure. Therefore, the protection scope of the present disclosure should be subject to the protection scope of the claims.

What I claim is:

1. A communication method, comprising:
   transmitting, by a terminal device, a preset uplink sequence, wherein the preset uplink sequence is selected from a sequence group that is obtained according to a logic index RACH Root SEQUENCE (Z-C sequence) and composed of sequences with different lengths or phases from a Physical Random Access Channel (PRACH), and wherein the preset uplink sequence is used for triggering a network device that receives the preset uplink sequence to transmit a first downlink reference signal; and
   receiving, by the terminal device, the first downlink reference signal transmitted by at least one first network device according to the preset uplink sequence; and
   receiving, by the terminal device, a downlink message transmitted by a second network device, wherein the downlink message comprises resource information and parameter information, the resource information is used for indicating a time domain and frequency domain resource occupied by each of the at least one first network device for transmitting the first downlink reference signal, the parameter information is used for indicating parameters used by each of the at least one first network device for transmitting the first downlink reference signal, and the parameters include an orthogonal cover code used and sequence composition information of the first downlink reference signal to be transmitted by the each of the at least one first network device,
   wherein receiving, by the terminal device, the first downlink reference signal transmitted by the at least one first network device according to the preset uplink sequence comprises:
      receiving, by the terminal device, the first downlink reference signal transmitted by the at least one first network device according to the resource information and the parameter information.

2. The communication method of claim 1, wherein the downlink message further comprises indication information used for indicating the terminal device, enabling the terminal device in an idle state to determine that the downlink message belongs to the terminal device according to the indication information.

3. The communication method of claim 2, wherein the indication information comprises the preset uplink sequence or an index of the preset uplink sequence.

4. The communication method of claim 2, wherein the communication method further comprises at least one of the following acts:
   transmitting, by the terminal device, location information used for indicating a location of the terminal device, wherein the indication information comprises the location information; and
   transmitting, by the terminal device, identification information used for identifying the terminal device, wherein the indication information comprises the identification information.

5. The communication method of claim 1, wherein the communication method further comprises:
   transmitting, by the terminal device, location information used for indicating a location of the terminal device, for the network device that receives the preset uplink sequence to determine whether to transmit the first downlink reference signal according to the location information.

6. The communication method of claim 1, wherein, before the terminal device transmits the preset uplink sequence, the communication method further comprises:
   receiving, by the terminal device, the first downlink reference signal transmitted by at least one third network device at a first density; and
   the preset uplink sequence is further used for triggering the network device that receives the preset uplink sequence to transmit the first downlink reference signal at a second density, and receiving, by the terminal device, the first downlink reference signal transmitted by the at least one first network device according to the preset uplink sequence comprises:
   receiving, by the terminal device, the first downlink reference signal transmitted by the at least one first network device at the second density according to the preset uplink sequence, wherein the second density is greater than the first density.

7. The communication method of claim 1, wherein transmitting, by the terminal device, the preset uplink sequence comprises:
   when a trigger condition is satisfied, transmitting, by the terminal device, the preset uplink sequence used for triggering the network device that receives the preset uplink sequence to transmit a downlink common reference signal, wherein the trigger condition comprises at least one of the following conditions:
   a receiving power for receiving a downlink signal transmitted by a fourth network device is less than a power threshold, wherein the fourth network device is used for controlling a serving cell of the terminal device or a residing cell of the terminal device; and
   the terminal device is located in a preset area of the fourth network device.

8. The communication method of claim 1, wherein the first downlink reference signal comprises a downlink reference signal used for the terminal device to perform analog beam forming.

9. The communication method of claim 1, wherein the preset uplink sequence is further used for performing at least one of the following acts:
   triggering, through at least one of a resource for transmitting the preset uplink sequence and a format of the preset uplink sequence, the network device that receives the preset uplink sequence to transmit the first downlink reference signal, and
   triggering the network device that receives the preset uplink sequence to transmit the first downlink reference signal at a second density.

10. A communication method, comprising:
    receiving, by a first network device, a preset uplink sequence transmitted by a terminal device, wherein the preset uplink sequence is selected from a sequence group that is obtained according to a logic index RACH Root SEQUENCE (Z-C sequence) and composed of sequences with different lengths or phases from a Physical Random Access Channel (PRACH), and wherein the preset uplink sequence is used for triggering a network device that receives the preset uplink sequence to transmit a first downlink reference signal;
    transmitting, by the first network device, the first downlink reference signal to the terminal device according to the preset uplink sequence; and transmitting, by the first network device, a downlink message to the terminal device, wherein the downlink message comprises first resource information and first parameter information, the first resource information is used for indicating a time domain and frequency domain resource occupied by the first network device for transmitting the first downlink reference signal, the first parameter information is used for indicating parameters used by the first network device for transmitting the first downlink reference signal, and the parameters include an orthogonal cover code used and sequence composition information of the first downlink reference signal to be transmitted by the first network device, wherein transmitting, by the first network device, the first downlink reference signal to the terminal device according to the preset uplink sequence comprises:
transmitting, by the first network device, the first downlink reference signal to the terminal device according to the first resource information and the first parameter information, and the preset uplink sequence.

11. A communication device, wherein the communication device is a terminal device and the communication device comprises a transceiver, a memory and a processor, the memory is used for storing program instructions, the processor is used for calling the program instructions stored in the memory, the processor controls the transceiver to receive or transmit information, and wherein the transceiver is configured to transmit a preset uplink sequence, wherein the preset uplink sequence is selected from a sequence group that is obtained according to a logic index RACH Root SEQUENCE (Z-C sequence) and composed of sequences with different lengths or phases from a Physical Random Access Channel (PRACH), and wherein the preset uplink sequence is used for triggering a network device that receives the preset uplink sequence to transmit a first downlink reference signal;

the transceiver is further configured to receive the first downlink reference signal transmitted by at least one first network device according to the preset uplink sequence;

the transceiver is further configured to receive a downlink message transmitted by a second network device, wherein the downlink message comprises resource information and parameter information, the resource information is used for indicating a time domain and frequency domain resource occupied by each of the at least one first network device for transmitting the first downlink reference signal, the parameter information is used for indicating parameters used by each of the at least one first network device for transmitting the first downlink reference signal, and the parameters include an orthogonal cover code used and sequence composition information of the first downlink reference signal to be transmitted by the each of the at least one first network device; and the transceiver is further configured to receive the first downlink reference signal transmitted by the at least one first network device according to the resource information and the parameter information.

12. The communication device of claim 11, wherein the downlink message further comprises indication information used for indicating the terminal device, enabling the terminal device in an idle state to determine that the downlink message belongs to the terminal device according to the indication information, and wherein the indication information comprises the preset uplink sequence or an index of the preset uplink sequence.

13. The communication device of claim 12, wherein the transceiver is further configured to perform at least one of the following acts:
transmitting location information used for indicating a location of the terminal device, wherein the indication information comprises the location information; and
transmitting identification information used for identifying the terminal device, wherein the indication information comprises the identification information.

14. The communication device of claim 11, wherein the transceiver is further configured to transmit location information used for indicating a location of the terminal device, for the network device that receives the preset uplink sequence to determine whether to transmit the first downlink reference signal according to the location information.

15. The communication device of claim 11, wherein the transceiver is further configured to receive the first downlink reference signal transmitted by at least one third network device at a first density;
the preset uplink sequence is further used for triggering the network device that receives the preset uplink sequence to transmit the first downlink reference signal at a second density; and
the transceiver is further configured to receive the first downlink reference signal transmitted by the at least one first network device at the second density according to the preset uplink sequence, wherein the second density is greater than the first density.

16. The communication device of claim 11, wherein the transceiver is further configured to, when a trigger condition is satisfied, transmit the preset uplink sequence used for triggering the network device that receives the preset uplink sequence to transmit a downlink common reference signal, wherein the trigger condition comprises at least one of the following conditions:
a receiving power used by the transceiver for receiving a downlink signal transmitted by a fourth network device is less than a power threshold, wherein the fourth network device is used for controlling a serving cell of the terminal device or a residing cell of the terminal device; and
the communication apparatus is located in a preset area of the fourth network device.

17. The communication device of claim 11, wherein the first downlink reference signal comprises a downlink reference signal used for the terminal device to perform analog beam forming.

18. The communication device of claim 11, wherein the preset uplink sequence is further used for performing at least one of the following acts:
triggering, through at least one of a resource for transmitting the preset uplink sequence and a format of the preset uplink sequence, the network device that receives the preset uplink sequence to transmit the first downlink reference signal, and
triggering the network device that receives the preset uplink sequence to transmit the first downlink reference signal at a second density.

* * * * *